E. J. Bird,
Refining Iron.
No. 108,235. Patented Oct. 11, 1870.
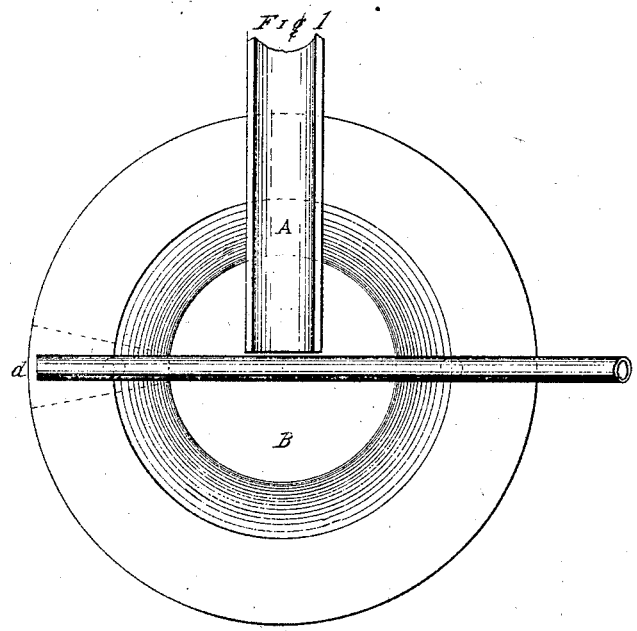
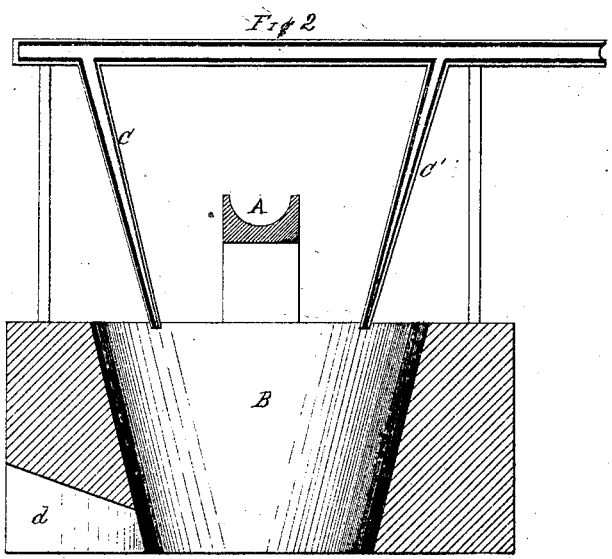

United States Patent Office.

EDWARD JAMES BIRD, OF FROSTBURG, MARYLAND.

Letters Patent No. 108,235, dated October 11, 1870.

IMPROVEMENT IN EXTRACTING IRON FROM THE SLAG OF BLAST-FURNACES.

The Schedule referred to in these Letters Patent and making part of the same.

*To all whom it may concern:*

Be it known that I, EDWARD JAMES BIRD, of Frostburg, Maryland, have invented a new and improved "Method of Extracting Iron or other Metals from the Ore," and I do hereby declare that the following is a full, clear, and exact description of same, reference being had to the accompanying drawing making a part of this specification.

The usual method of obtaining iron from iron ore in blast-furnaces, by smelting the ore with fluxes, or alone by means of carbonaceous fuel and blast, is well known, as is also the method of obtaining malleable iron direct from iron ore melted with blast and charcoal, in a bloomery.

My method consists in obtaining iron direct from iron ore, or from slag containing oxide of iron, by mixing either of these substances with the fluid slag which runs from a blast-furnace wherein iron ore is smelted with carbonaceous fuel. The heat of the slag is found sufficient to smelt the ore, and the iron in it separates from the slag by its superior specific gravity.

The drawing shows the apparatus, constructed so as to accomplish my improved method, in which—

Figure 1 is a plan view of the apparatus used in conjunction with my method to accomplish the extracting of iron or other metals from the ore.

Figure 2 is a plan view of same.

To enable those skilled in the art to use my invention, I will now proceed to describe it.

The slag from the blast-furnace flows through the trough A into the receptacle B, formed of iron, firebrick, or other suitable material.

C and C' are two tuyeres or tubes, through which air or gas may be forced upon and into the fluid slag.

The iron when formed is tapped out through the tap-hole *d*.

The operation is as follows:

Powdered ore, or slag containing oxide of iron, is placed in the receptacle B, and a stream of slag from a blast-furnace directed in upon it. The heat of the slag soon melts the ore, which is quickly reduced, the iron is carbonized and flows to the bottom of the vessel. More ore is added as it is required.

Blast or gas is forced through the tuyeres, which keeps the slag in constant agitation, and facilitates the separation of the iron. Small coke-dust or refuse coal may be thrown on the surface of the slag, by which the heat is retained, so that it will flow out of the receptacle, after it has given off a portion of its heat to the ore that has been smelted.

The above-described operation is either continuous or intermittent, and is under the control of the person attending the blast-furnace.

In some instances, where the blast-furnace is small from which the slag is used, the receptacle B may be made of cast or wrought-iron, and provided with hooks or rings by which it can be lifted from its place with a crane, and replaced by another. The iron and slag may then cool together, and afterward separated. This, however, is only where the operation is carried on slowly.

In large furnaces yielding abundance of slag, the iron will be formed so rapidly that it may be tapped into molds in the same manner as pigs are usually formed.

Having thus described my invention,

What I claim, and desire to secure by Letters Patent of the United States, is—

1. The method of obtaining iron by applying the heat carried off by slag from a blast-furnace to smelt iron ore, or slag containing iron, substantially as specified.

2. Jets of blast or gas applied to fluid slag, to more effectually mix iron, or oxide of iron with it, to facilitate the separation of the iron formed by the mixture, substantially as specified.

In testimony whereof, I have hereunto signed my name in the presence of two subscribing witnesses.

EDWARD JAMES BIRD. [L. S.]

Witnesses:
 G. W. BIRDSALL,
 BENJ. THOMAS.